US012802425B2

(12) United States Patent
Kosman et al.

(10) Patent No.: US 12,802,425 B2
(45) Date of Patent: Nov. 17, 2026

(54) METHOD FOR GENERATING A GRAPH STRUCTURE FOR TRAINING A GRAPH NEURAL NETWORK

(71) Applicant: Robert Bosch GmbH, Stuttgart (DE)

(72) Inventors: Eitan Kosman, Haifa (IL); Dotan Di Castro, Haifa (IL); Joel Oren, Tel Aviv (IL)

(73) Assignee: ROBERT BOSCH GMBH, Stuttgart (DE)

(*) Notice: Subject to any disclaimer, the term of this patent is extended or adjusted under 35 U.S.C. 154(b) by 779 days.

(21) Appl. No.: 17/812,480

(22) Filed: Jul. 14, 2022

(65) Prior Publication Data

US 2023/0101250 A1 Mar. 30, 2023

(30) Foreign Application Priority Data

Sep. 28, 2021 (DE) ..................... 10 2021 210 846.6

(51) Int. Cl.

*G06V 10/82* (2022.01)
*G06F 16/901* (2019.01)
*G06V 10/764* (2022.01)
*G06V 10/774* (2022.01)

(52) U.S. Cl.

CPC .......... *G06V 10/82* (2022.01); *G06F 16/9024* (2019.01); *G06V 10/764* (2022.01); *G06V 10/7747* (2022.01)

(58) Field of Classification Search

CPC .. G06V 10/82; G06V 10/764; G06V 10/7747; G06V 10/774; G06F 16/9024

See application file for complete search history.

(56) References Cited

U.S. PATENT DOCUMENTS

| | | | | |
|---|---|---|---|---|
| 11,244,156 | B1 * | 2/2022 | Lakshman | G06F 16/9014 |
| 2011/0029571 | A1 * | 2/2011 | Aggarwal | G06F 16/9024 707/798 |
| 2014/0280143 | A1 * | 9/2014 | Milenova | G06F 16/35 707/737 |
| 2017/0046614 | A1 * | 2/2017 | Golovashkin | G06N 3/082 |
| 2017/0132513 | A1 | 5/2017 | Yu et al. | |

(Continued)

FOREIGN PATENT DOCUMENTS

CN 112633403 A * 4/2021

OTHER PUBLICATIONS

Mutzel et al. "Algorithmic Data Science" (2019) 36th International Symposium on Theoretical Aspects of Computer Science (STACS 2019), 15 Pages.

(Continued)

*Primary Examiner* — Sumati Lefkowitz
*Assistant Examiner* — Anna Lei
(74) *Attorney, Agent, or Firm* — NORTON ROSE FULBRIGHT US LLP

(57) ABSTRACT

A method for generating a graph structure for training a graph neural network. The method includes: obtaining data representing a computational graph, wherein the computational graph comprises a plurality of nodes connected by edges; and generating the graph structure for training the graph neural network by removing edges from the computational graph. The edges are removed in such a way that an environment in the computational graph corresponds to an environment in the graph structure.

10 Claims, 3 Drawing Sheets

(56) References Cited

U.S. PATENT DOCUMENTS

2019/0386819 A1* 12/2019 Ertl ....................... H04L 9/0643
2021/0232918 A1* 7/2021 Cheng ...................... G06N 3/08

OTHER PUBLICATIONS

Srinivasa et al. "Fast Graph Attention Networks Using Effective Resistance Based Graph Sparsification" (2020) arXiv:2006.08796v. 20 Pages.
Chen et al. "FastGCN: Fast Learning with Graph Convolutional Networks via Importance Sampling" (2018), ICLR 2018, arXiv:1801.10247v. 15 Pages.
Nazir et al. "Survey of Image Based Graph Neural Networks" (2021) arXiv:2106.06307v. 6 Pages.

* cited by examiner

METHOD FOR GENERATING A GRAPH STRUCTURE FOR TRAINING A GRAPH NEURAL NETWORK

CROSS REFERENCE

The present application claims the benefit under 35 U.S.C. § 119 of German Patent Application No. DE 10 2021 210 846.6 filed on Sep. 28, 2021, which is expressly incorporated herein by reference in its entirety.

FIELD

The present invention relates to a method for generating a graph structure for training a graph neural network, with which training and implementation of graph neural networks can be improved and with which, at the same time, computer resources can be saved.

BACKGROUND INFORMATION

Graph Neural Networks (GNNs) are a class of deep learning methods designed to perform inference on data described by graphs, wherein the graphs respectively comprise a plurality of nodes connected by edges. Such graph neural networks have become extremely popular for tasks involving graph data. Therein, graph neural networks often employ architectures that utilize message-passing, for example graph convolutional networks. In such architectures, data respectively information is propagated from a node of the graph through the neighbourhood of the corresponding node in order to generate a representation that depends on wide graph environments. Further, each node can represent a respective operation performed by the neural network as part of determining a neural network output from a neural network input This makes graph neural networks suitable for learning many real-world tasks.

However, real-world problems often involve very large graphs, wherein a lot of computer resources are required for training such a graph neural network, and wherein there might also be scenarios where much more computer resources are required for training such a graph neural network than common systems can provide. The size of the graphs frequently also causes graph neural networks to be overfitted if they are not properly regularized. Further, for example graph convolutional networks or graph attention networks are computer intensive tasks due to their mechanisms of neighbourhood aggregation, which utilizes computations of self-attentions to assign weights for neighbouring nodes.

In order to address these problems, it is conventional to base the training of such a graph neural network on a simplified architecture or graph structure. This is, for example, possible as very large graphs often involve many redundant components which can be removed, in order to simplify the training of such a graph neural network.

U.S. Patent Application Publication No. US 2017/0132513 A1 describes a method for training a neural network represented as a computational graph, wherein data representing a computational graph is obtained. The computational graph is then augmented to generate a training computational graph for training the neural network using a machine learning training algorithm that includes computing a gradient of an objective function with respect to each of the parameters of the neural network. Augmenting the computational graph includes inserting a plurality of gradient nodes and training edges into the computational graph to generate a backward path through the computational graph that represents operations for computing the gradients of the objective function with respect to the parameters of the neural network. The neural network is trained using the machine learning training algorithm by executing the training computational graph.

SUMMARY

It is an object of the present invention to provide an improved method for generating a graph structure for training a graph neural network, with which training and implementation of graph neural networks can be improved and with which, at the same time, computer resources can be saved.

This object may be achieves by a method for generating a graph structure for training a graph neural network according to the present invention.

Further, this object may be achieved by the control unit for generating a graph structure for training a graph neural network according to the present invention.

According to one example embodiment of the present invention, this object may be achieved by a method for generating a graph structure for training a graph neural network, wherein data representing a computational graph is obtained, wherein the computational graph comprises a plurality of nodes connected by edges, and wherein the graph structure for training the graph neural network is generated by removing edges from the computational graph, wherein the edges are removed in such a way, that an environment in the computational graph corresponds to an environment in the graph structure.

Here an environment in a graph or an environment in the computational graph or the generated graph structure is a structure or a composition of nodes of a part of the graph. That an environment in the computational graph corresponds to an environment in the generated graph structure means that environments that are similar to environments in the computational graph are also included in the generated graph structure.

That a simplified architecture for the training of the graph neural network is generated has the advantage that the amount of computer recourses that are required for training the graph neural network based on the generated graph structure, for example storage space and/or processing time, can be significantly reduced. Thereby, it can be ensured that the graph neural network can also be trained by common systems with limited resources. Further, by training the graph neural network on such a reduced graph structure, also the subsequent implementation of the graph neural network can be greatly simplified.

Further, the fact that environments that are included in the computational graph are also included in the generated graph structure has the additional advantage that the performance of the trained graph neural network is not significantly reduced by training the graph neural network based on the generated reduced graph structure.

Thus, an improved method for generating a graph structure for training a graph neural network is provided, with which training and implementation of graph neural networks, in particular graph neural networks that utilize message-passing can be improved and with which, at the same time, computer resources can be saved.

In one embodiment of the present invention, respectively at least one edge attribute is assigned to each edge of the computational graph, wherein the step of generating the graph structure for training the graph neural network by removing edges from the computational graph comprises removing edges from the computational graph based on the edge attributes assigned to the edges of the computational graph.

Therein, edge attributes mean data associated with edges. Here the edge attributes in particular define relations between nodes of the computational graph, in particular nodes of the computational graph connected by the corresponding edge. For example, the edge attributes can, among others, define how many edges are connected to a specific node of the computational graph or how many edges are respectively connected between two specific nodes of the graph.

By taking into account these edge attributes respectively the relations between nodes of the computational graph when removing edges from the computational graph, a simplified architecture respectively graph structure for the training of the graph neural network can be generated. At the same time, it can be ensured that environments or structures or compositions of nodes of parts of the computational graph correspond to environments in the generated graph structure or that similar environments are also included in the generated graph structure.

Therein, the step of generating the graph structure for training the graph neural network by removing edges from the computational graph can comprise, for all edges of the computational graph, respectively assigning a signature to an edge of the computational graph based on the at least one edge attribute assigned to the corresponding edge, so that similar edges are assigned with the same signature, applying a hash function to respectively convert the signatures assigned to the edges of the computational graph into a numerical value, and, for all nodes of the computational graph, respectively maintaining the edges of the computational graph that are connected to a node of the computational graph and whose signatures are converted into the minimum of all the numerical values and removing all other edges that are connected to the corresponding node from the computational graph.

Here signatures mean graph signatures and, in particular, mathematical signatures to define graph similarity or similarity between edges. Therefore, based on the graph signature assigned to an edge it can be derived whether the edge fulfils a given feature or whether a subset of the computational graph that includes the edge satisfies at least one graph property. For example, based on the signature it can be derived to which nodes the corresponding edge is connected.

Therein, similar edges are edges of the computational graph that are assigned with the same at least one edge attribute.

Further, a hash function is any function that can be used to map data of arbitrary size to fixed-size values.

Thus, the generated graph structure can be easily obtained by conventional mathematical operations that can be implemented even on common systems with limited computer resources.

In one embodiment of the present invention, the edge attributes assigned to the edges of the computational graph are respectively generated based on at least one node attribute of at least one node that is connected to the corresponding edge. Thereby, it can be taken into account that many computational graphs do not include edge attributes but node attributes that define data associated to nodes, for example type, label, styling attributes such as width, if available, or arbitrary data values available for nodes, wherein the edge attributes can be derived from the node attributes.

According to another embodiment of the present invention, a method for training a graph neural network is provided, wherein a graph structure for training the graph neural network is generated by a method for generating a graph structure for training a graph neural network as described above, wherein training data for training the graph neural network is provided, and wherein the graph neural network is trained based on the generated graph structure and the training data.

Thus, a method for training a graph neural network based on an improved graph structure is provided. In particular, that the training of the graph neural network is based on a simplified architecture has the advantage that the amount of computer recourses that are required for training the graph neural network based on the generated graph structure, for example storage space and/or processing time, can be significantly reduced. Thereby, it can be ensured that the graph neural network can also be trained by common systems with limited resources. Further, by training the graph neural network on such a reduced graph structure, also the subsequent implementation of the graph neural network can be greatly simplified. Further, the fact that environments that are included in the computational graph are also included in the generated graph structure has the additional advantage that the performance of the trained graph neural network is not significantly reduced by training the graph neural network based on the generated reduced graph structure.

Furthermore, the training data can comprises sensor data.

Sensor data is the output of a device that detects and responds to some type of input from the physical environment. The output may be used to provide information or input to another system or to guide a process.

Thus, the method of the present invention can be based on circumstances outside of the data processing equipment on which the graph neural network is trained.

According to still a further embodiment of the present invention, a method for classifying image data by a graph neural network is provided, wherein the graph neural network has been trained by a method for training a graph neural network as described above.

Therein, the method for classifying image data by the graph neural network can be a method for classifying digital image data based on low-level features, for example edges or pixel attributes for images.

Thus, a method for classifying image data that is based on a graph neural network trained on an improved graph structure is provided according to the present invention. In particular, the fact that the training of the graph neural network is based on a simplified architecture has the advantage that the amount of computer recourses that are required for training the graph neural network based on the generated graph structure, for example storage space and/or processing time, can be significantly reduced.

Thereby, it can be ensured that the graph neural network can also be trained by common systems with limited resources. Further, by training the graph neural network on such a reduced graph structure, also the subsequent implementation of the graph neural network or the subsequent classification of image data can be greatly simplified. Further, that environments that are included in the computational graph are also included in the generated graph structure has the additional advantage that the performance of the trained graph neural network is not significantly reduced by training the graph neural network based on the generated reduced graph structure.

According to a further embodiment of the present invention, a control unit for generating a graph structure for training a graph neural network is provided, wherein the control unit comprises an obtaining unit that is configured to obtain data representing a computational graph, wherein the computational graph comprises a plurality of nodes connected by edges, and a first generating unit that is configured to generate the graph structure for training the graph neural network by removing edges from the computational graph, wherein the first generating unit is configured to remove the edges from the computational graph in such a way, that an environment in the computational graph corresponds to an environment in the graph structure.

Thus, a control unit for generating an improved graph structure for training a graph neural network is provided according to the present invention. In particular, that the training of the graph neural network is based on a simplified architecture has the advantage that the amount of computer resources that are required for training the graph neural network based on the generated graph structure, for example storage space and/or processing time, can be significantly reduced. Thereby, it can be ensured that the graph neural network can also be trained by common systems with limited resources. Further, by training the graph neural network on such a reduced graph structure, also the subsequent implementation of the graph neural network can be greatly simplified. Further, that environments that are included in the computational graph are also included in the generated graph structure has the additional advantage that the performance of the trained graph neural network is not significantly reduced by training the graph neural network based on the generated reduced graph structure.

In one embodiment of the present invention, respectively at least one edge attribute is assigned to each edge of the computational graph, wherein the first generating unit is configured to remove edges from the computational graph based on edge attributes assigned to the edges of the computational graph. By taking into account these edge attributes or the relations between nodes of the computational graph when removing edges from the computational graph, a simplified architecture respectively graph structure for the training of the graph neural network can be generated. At the same time, it can be ensured that environments or structures or composition of nodes of parts of the computational graph correspond to environments in the generated graph structure or that similar environments are also included in the generated graph structure.

Therein, the first generating unit can further comprise an assigning unit that is configured for all edges of the computational graph, to respectively assign a signature to an edge of the computational graph based on the at least one edge attribute assigned to the corresponding edge, so that similar edges are assigned with the same signature, a computing unit that is configured to apply a hash function to respectively convert the signatures assigned to the edges of the computational graph into a numerical value, and a removing unit that is configured for all nodes of the computational graph, to respectively maintain the edges of the computational graph that are connected to a node of the computational graph and whose signatures are converted into the minimum of all the numerical values and to remove all other edges that are connected to the corresponding node from the computational graph. Thus, the generated graph structure can be easily obtained by conventional mathematical operations that can be implemented even on common systems with limited computer resources.

The control unit can further comprise a second generating unit that is configured for all edges of the computational graph, to respectively generate the at least one edge attribute based on at least one node attribute of at least one node that is connected to the corresponding edge. Thereby, it can be taken into account that many computational graphs do not include edge attributes but node attributes that define data associated to nodes, for example type, label, styling attributes such as width, if available, or arbitrary data values available for nodes, wherein the edge attributes can be derived from the node attributes.

According to still a further embodiment of the present invention, a control unit for training a graph neural network is provided, wherein the control unit comprises a first receiver for receiving a graph structure for training the graph neural network generated by a control unit for generating a graph structure for training a graph neural network as described above, a second receiver for receiving training data for training the graph neural network, and a training unit that is configured to train the graph neural network based on the graph structure and the training data.

Thus, a control unit for training a graph neural network based on an improved graph structure is provided according to the present invention. In particular, that the training of the graph neural network is based on a simplified architecture has the advantage that the amount of computer recourses that are required for training the graph neural network based on the generated graph structure, for example storage space and/or processing time, can be significantly reduced. Thereby, it can be ensured that the graph neural network can also be trained by common systems with limited resources. Further, by training the graph neural network on such a reduced graph structure, also the subsequent implementation of the graph neural network can be greatly simplified. Further, that environments that are included in the computational graph are also included in the generated graph structure has the additional advantage that the performance of the trained graph neural network is not significantly reduced by training the graph neural network based on the generated reduced graph structure.

Furthermore, the training data can include sensor data. Thus, the training of the graph neural network by the control unit can be based on circumstances outside of the data processing equipment on which the graph neural network is trained.

According to still another embodiment of the present invention, an image classifier for classifying image data is provided, wherein the image classifier comprises a receiver for receiving a graph neural network trained by a control unit for training a graph neural network as described above, and a classifying unit that is configured to classify image data by the graph neural network.

Therein, the image classifier can be configured for classifying digital image data based on low-level features, for example edges or pixel attributes for images.

Thus, an image classifier for classifying image data that is based on a graph neural network trained on an improved graph structure is provided according to the present invention. In particular, that the training of the graph neural network is based on a simplified architecture has the advantage that the amount of computer recourses that are required for training the graph neural network based on the generated graph structure, for example storage space and/or processing time, can be significantly reduced. Thereby, it can be ensured that the graph neural network can also be trained by common systems with limited resources. Further, by training the graph neural network on such a reduced graph structure, also the subsequent implementation of the graph neural network or the subsequent classification of image data can be greatly simplified. Further, that environments that are included in the computational graph are also included in the generated graph structure has the additional advantage that the performance of the trained graph neural network is not significantly reduced by training the graph neural network based on the generated reduced graph structure.

The present invention will now be described in further detail with reference to the figures.

DETAILED DESCRIPTION OF EXAMPLE EMBODIMENTS

Figure 1:
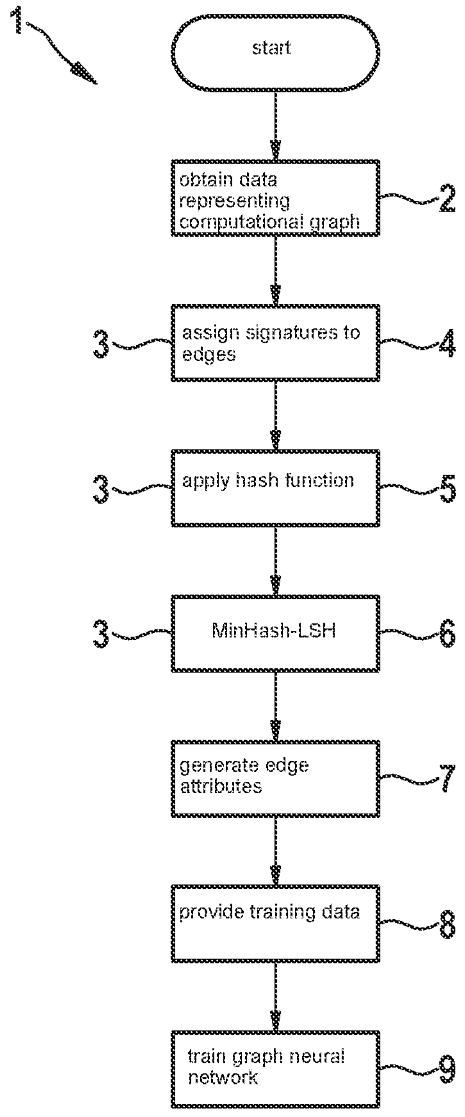
FIG. 1 illustrates a flowchart of a method for training a graph neural network according to embodiments of the present invention.

FIG. 1 illustrates a flowchart of a method 1 for training a graph neural network according to embodiments of the present invention.

Graph Neural Networks (GNNs) are a class of deep learning methods designed to perform inference on data described by graphs, wherein the graphs respectively comprise a plurality of nodes connected by edges. Such graph neural networks have become extremely popular for tasks involving graph data. Therein, graph neural networks often employ architectures that utilize message-passing, for example graph convolutional networks. In such architectures, data or information is propagated from a node of the graph through the neighbourhood of the corresponding node in order to generate a representation that depends on wide graph environments. Further, each node can represent a respective operation performed by the neural network as part of determining a neural network output from a neural network input This makes graph neural networks suitable for learning many real-world tasks.

However, real-world problems often involve very large graphs, wherein a lot of computer resources are required for training such a graph neural network, and wherein there might also be scenarios where much more computer resources are required for training such a graph neural network than common systems can provide. The size of the graphs frequently also causes graph neural networks to be overfitted if they are not properly regularized. Further, for example graph convolutional networks or graph attention networks are computer intensive tasks due to their mechanisms of neighbourhood aggregation, which utilizes computations of self-attentions to assign weights for neighbouring nodes.

In order to address these problems, it is conventional to base the training of such a graph neural network on a simplified architecture respectively graph structure. This is, for example, possible as very large graphs often involve many redundant components which can be removed, in order to simplify the training of such a graph neural network.

FIG. 1 shows a method 1 for generating a graph structure for training a graph neural network, wherein in a first step 2 data representing a computational graph is obtained, wherein the computational graph comprises a plurality of nodes connected by edges, and wherein in a further step 3 the graph structure for training the graph neural network is generated by removing edges from the computational graph, wherein the edges are removed in such a way, that an environment in the computational graph corresponds to an environment in the graph structure.

In particular, FIG. 1 shows a method for generating a graph structure that is easy to process, wherein training and usage or implementation of a graph neural network based on the generated graph structure can be significantly accelerated.

That a simplified architecture for the training of the graph neural network is generated has the advantage that the amount of computer recourses that are required for training the graph neural network based on the generated graph structure, for example storage space and/or processing time, can be significantly reduced. Thereby, it can be ensured that the graph neural network can also be trained by common systems with limited resources. Further, by training the graph neural network on such a reduced graph structure, also the subsequent implementation or usage of the graph neural network can be greatly simplified.

Further, that environments that are included in the computational graph are also included in the generated graph structure has the additional advantage that the performance of the trained graph neural network is not significantly reduced by training the graph neural network based on the generated reduced graph structure.

Thus, FIG. 1 shows an improved method for generating a graph structure for training a graph neural network, with which training and implementation of graph neural networks, in particular graph neural networks that utilize message-passing can be improved and with which, at the same time, computer resources can be saved.

According to the embodiments of FIG. 1, respectively at least one edge attribute is assigned to each edge of the computational graph, wherein the step 3 of generating the graph structure by training the graph neural network by removing edges from the computational graph comprises removing edges from the computational graph based on the edge attributes assigned to the edges of the computational graph.

Therein, edge attributes mean data associated with edges. Here the edge attributes in particular define relations between nodes of the computational graph. For example, the edge attributes can, among others, define how many edges are connected to a specific node of the computational graph or how many edges are respectively connected between two specific nodes of the graph. The edge attributes can for example be in vector or list form.

According to the embodiments of FIG. 1, step 3 of generating the graph structure for training the graph neural network by removing edges from the computational graph further comprises step 4 of, for all edges of the computational graph, respectively assigning a signature to an edge of the computational graph based on the at least one edge attribute assigned to the corresponding edge, so that similar edges are assigned with the same signature or that the same signature is assigned to similar edges, step 5 of applying a hash function to respectively convert the signatures assigned to the edges of the computational graph into a numerical value, and step 6 of, for all nodes of the computational graph, respectively maintaining edges of the computational graph that are connected to a node of the computational graph and whose signatures are converted into the minimum of all the numerical values and removing all other edges that are connected to the corresponding node from the computational graph.

Therein, in step 6, for example the min-wise independent permutations locality sensitive hashing (MinHash-LSH) can be used, which is a technique for finding similar items efficiently in large databases.

Further, the hash function can be a pseudo-random hash function. This pseudo-random hash function can then be used across all graph regions or environments of the computational graph, wherein the method results in a graph structure, wherein regions of the graph structure are similar to corresponding regions in the computational graph, wherein edges whose signatures have not been converted into the minimum value of all the numerical values have been removed.

As shown in FIG. 1, the method 1 further comprises step 7 of, for all edges of the computational graph, generating the at least one edge attribute assigned to an edge of the computational graph based on at least one node attribute of at least one node that is connected to the corresponding edge.

For example, the edge attribute of an edge of the computational graph can be a vector that is composed of a vector that represents the node attribute of a first node connected to the edge and vector that represents the node attribute of a second node connected to the edge.

The method 1 further comprises step 8 of providing training data for training the graph neural network, and step 9 of training the graph neural network based on the generated graph structure and the training data.

According to the embodiments of FIG. 1, the training data includes sensor data, wherein the sensor data can for example be acquired by a video camara, a RADAR, a LiDAR or an ultrasonic sensor.

The trained graph neural network can then be implemented respectively be used for image classification. For example, the graph neural network can be used to detect traffic signs, road surfaces, pedestrians or vehicles in digital images.

However, for example based on the kind of training data, the trained graph neural network can also be used to determine a continuous value or multiple continuous values for example regarding a distance, a velocity or an acceleration, or to control the functions of an electronic control unit, for example an electronic control unit of a car.

Figure 2A:
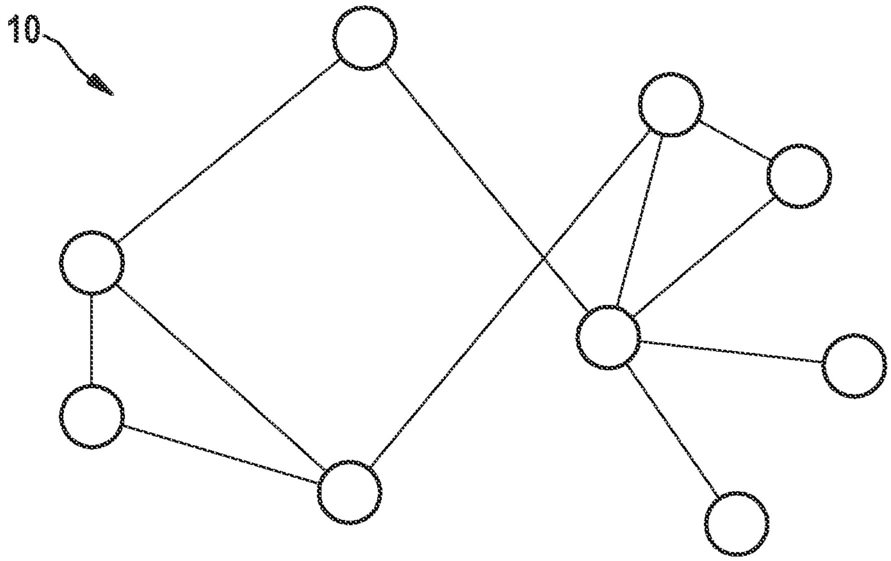
FIGS. 2A-2B illustrate a part of a method for training a graph neutral network according to embodiments of the present invention.
Figure 2B:
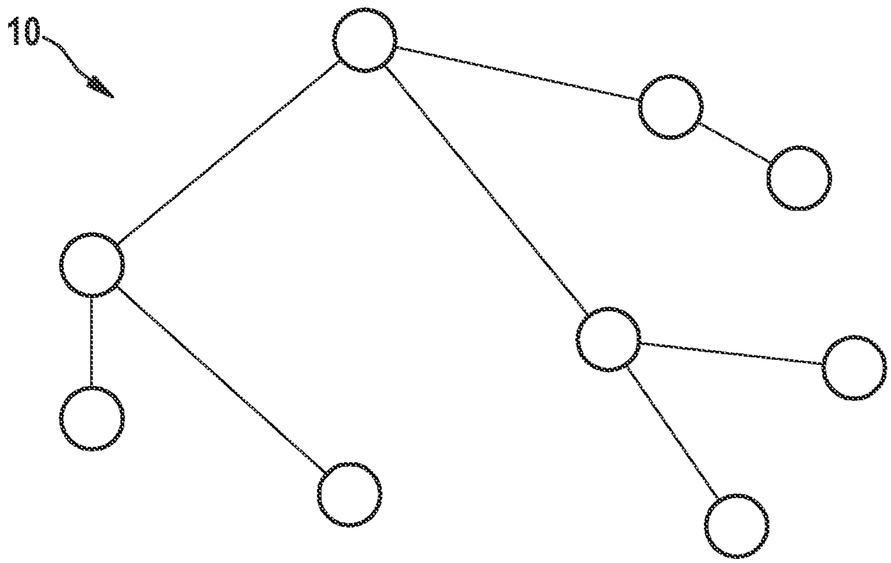

FIGS. 2A and 2B illustrate a part of a method for training a graph neutral network according to embodiments of the present invention.

In particular, FIG. 2A and FIG. 2B illustrate the step of generating the graph structure for training the graph neural network by removing edges from the computational graph.

Further, FIG. 2A shows a region of the computational graph, wherein the region defines an environment 10 respectively a composition of nodes in the computational graph, wherein these nodes are connected by edges. FIG. 2B shows the same region in the generated graph structure, and therefore, after edges have been removed by the step of generating the graph structure for training the graph neural network by removing edges from the computational graph.

As can be seen in FIG. 2B, the same environment 10 respectively composition of nodes as shown in FIG. 2A is also included in the generated graph structure. In particular, step of generating the graph structure for training the graph neural network by removing edges from the computational graph in such a way, that an environment 10 in the computational graph corresponds to an environment 10 in the graph structure. Therein, the edges can again for example be removed based on respectively assigning a signature to the edges of the computational graph and applying a hash function to these signatures.

Figure 3:
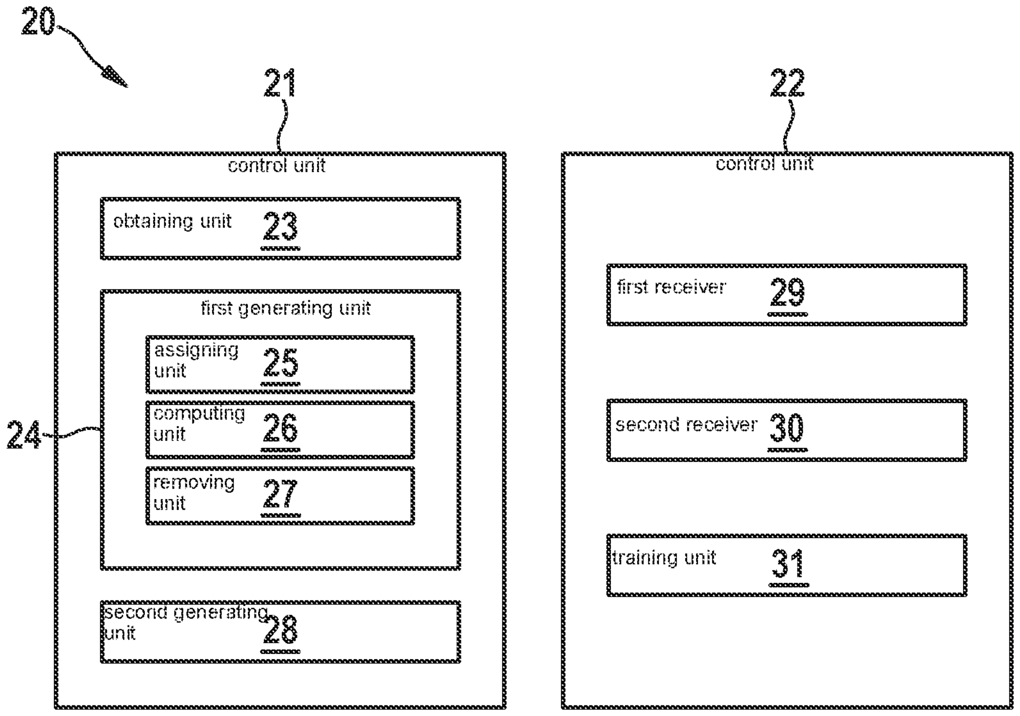
FIG. 3 illustrates a system for training a graph neural network according to embodiments of the present invention.

FIG. 3 illustrates a system 20 for training a graph neural network according to embodiments of the present invention.

As shown in FIG. 3, the system 20 comprises a control unit 21 for generating a graph structure for training a graph neural network and a control unit 22 for training a graph neural network, wherein the control unit 22 for training a graph neural network is configured to train a graph neural network based on a graph structure generated by the control unit 21 for generating a graph structure for training a graph neural network.

According to the embodiments of FIG. 3, the control unit 21 for generating a graph structure for training a graph neural network comprises an obtaining unit 23 that is configured to obtain data representing a computational graph, wherein the computational graph comprises a plurality of nodes connected by edges, and a first generating unit 24 that is configured to generate the graph structure for training the graph neural network by removing edges from the computational graph, wherein the first generating unit 24 is configured to remove edges from the computational graph in such a way, that an environment in the computational graph corresponds to an environment in the graph structure.

Therein, the obtaining unit can for example include a receiver that is configured to receive data representing the computational graph, or an input device, wherein data representing the computational graph can be inputted via the input device. The first generating unit can further be implemented by code that is stored in a memory and processable by a processor.

According to the embodiments of FIG. 3, respectively at least one edge attribute is assigned to each edge of the computational graph and the first generating unit 24 is configured to remove edges from the computational graph based on the edge attributes assigned to the edges of the computational graph.

As shown in FIG. 3, the first generating unit further comprises an assigning unit 25 that is configured to, for all edges of the computational graph, respectively assign a signature to an edge of the computational graph based on the at least one edge attribute assigned to the corresponding edge, so that similar edges are assigned with the same signature, a computing unit 26 that is configured to apply a hash function to respectively convert the signatures assigned to the edges of the computational graph into a numerical value, and a removing unit 27 that is configured to, for all nodes of the computational graph, respectively maintain the edges of the computational graph connected to a node of the computational graph and whose signatures are converted into the minimum of all numerical values and to remove all other edges connected to the corresponding node from the computational graph.

Further, the assigning unit, the computing unit and the removing unit can e.g. be implemented by code that is stored in a memory and processable by a processor.

The shown control unit 21 further comprises a second generating unit 28 that is configured to, for all edges of the computational graph, respectively generate the at least one edge attribute based on at least one node attribute of at least one node that is connected to the corresponding edge.

The second generating unit can again for example be implemented by code that is stored in a memory and processable by a processor.

According to the embodiments of FIG. 3, the shown control unit 22 for training a graph neural network comprises a first receiver 29 for receiving a graph structure for training the graph neural network that is generated by the control unit 21 for generating a graph structure for training a graph neural network, a second receiver 30 for receiving training data for training the graph neural network, and a training unit 31 that is configured to train the graph neural network based on the graph structure and the training data.

The training unit can again for example be implemented by code that is stored in a memory and processable by a processor.

Further, according to the embodiments of FIG. 3, the training data includes sensor data, in particular sensor data acquired by one or more optical sensors.

What is claimed is:

1. A method for generating a graph structure for training a graph neural network, the method comprising the following steps:

obtaining data representing a computational graph, the computational graph including a plurality of nodes connected by edges;

generating the graph structure for training the graph neural network by removing edges from the computational graph, the edges being removed in such a way that an environment in the computational graph corresponds to an environment in the graph structure, wherein at least one edge attribute is assigned to each edge of the computational graph, and the step of generating the graph structure for training the graph neural network by removing edges from the computational graph includes removing edges from the computational graph based on the edge attributes assigned to the edges of the computational graph, and wherein the at least one edge attribute defines relations between nodes of the computational graph connected by the corresponding edge;

assigning, for all edges of the computational graph, a signature to each respective edge of the computational graph based on the at least one edge attribute assigned to the respective edge, so that similar edges are assigned with the same signature;

applying a hash function to respectively convert the signatures assigned to the edges of the computational graph into a numerical value; and maintaining, for all nodes of the computational graph, those of the edges of the computational graph that are connected to a node of the computational graph and whose signatures are converted by the hash function into a minimum of all the numerical values and removing all other edges that are connected to the corresponding node of the computational graph; and training the graph neural network based on the generated graph structure and the training data.

2. The method according to claim 1, wherein the method further comprises:

generating, for all edges of the computational graph, the at least one edge attribute assigned to an edge of the computational graph based on at least one node attribute of at least one node that is connected to the corresponding edge.

3. A method for training a graph neural network, the method comprising the following steps:

generating a graph structure for training the graph neural network by:

obtaining data representing a computational graph, the computational graph includes a plurality of nodes connected by edges, and generating the graph structure for training the graph neural network by removing edges from the computational graph, the edges being removed in such a way that an environment in the computational graph corresponds to an environment in the graph structure, wherein at least one edge attribute is assigned to each edge of the computational graph, and the step of generating the graph structure for training the graph neural network by removing edges from the computational graph includes removing edges from the computational graph based on the edge attributes assigned to the edges of the computational graph, and wherein the at least one edge attribute defines relations between nodes of the computational graph connected by the corresponding edge;

providing training data for training the graph neural network, assigning, for all edges of the computational graph, a signature to each respective edge of the computational graph based on the at least one edge attribute assigned to the respective edge, so that similar edges are assigned with the same signature, applying a hash function to respectively convert the signatures assigned to the edges of the computational graph into a numerical value, and maintaining, for all nodes of the computational graph, those of the edges of the computational graph that are connected to a node of the computational graph and whose signatures are converted by the hash function into a minimum of all the numerical values and removing all other edges that are connected to the corresponding node of the computational graph; and training the graph neural network based on the generated graph structure and the training data.

4. The method according to claim 3, wherein the training data includes sensor data.

5. A method for classifying image data by a graph neural network, the method comprising the following steps:

classifying image data using the graph neural network, the graph neural network being trained by:

generating a graph structure for training the graph neural network by:

obtaining data representing a computational graph, the computational graph includes a plurality of nodes connected by edges, and generating the graph structure for training the graph neural network by removing edges from the computational graph, the edges being removed in such a way that an environment in the computational graph corresponds to an environment in the graph structure;

providing training data for training the graph neural network, wherein at least one edge attribute is assigned to each edge of the computational graph, and the step of generating the graph structure for training the graph neural network by removing edges from the computational graph includes removing edges from the computational graph based on the edge attributes assigned to the edges of the computational graph, and wherein the at least one edge attribute defines relations between nodes of the computational graph connected by the corresponding edge, assigning, for all edges of the computational graph, a signature to each respective edge of the computational graph based on the at least one edge attribute assigned to the respective edge, so that similar edges are assigned with the same signature, applying a hash function to respectively convert the signatures assigned to the edges of the computational graph into a numerical value, maintaining, for all nodes of the computational graph, those of the edges of the computational graph that are connected to a node of the computational graph and whose signatures are converted by the hash function into a minimum of all the numerical values and removing all other edges that are connected to the corresponding node of the computational graph, and training the graph neural network based on the generated graph structure and the training data.

6. A control unit configured to generate a graph structure for training a graph neural network, the control unit including a hardware processor configured to:

obtain data representing a computational graph, the computational graph including a plurality of nodes connected by edges; and generate the graph structure for training the graph neural network by removing edges from the computational graph, wherein the hardware processor is configured to remove the edges from the computational graph in such a way, that an environment in the computational graph corresponds to an environment in the graph structure, wherein at least one edge attribute is assigned to each edge of the computational graph, and the step of generating the graph structure for training the graph neural network by removing edges from the computational graph includes removing edges from the computational graph based on the edge attributes assigned to the edges of the computational graph, and wherein the at least one edge attribute defines relations between nodes of the computational graph connected by the corresponding edge;

assign, for all edges of the computational graph, a signature to each respective edge of the computational graph based on the at least one edge attribute assigned to the respective edge, so that similar edges are assigned with the same signature;

apply a hash function to respectively convert the signatures assigned to the edges of the computational graph into a numerical value; and maintain, for all nodes of the computational graph, those of the edges of the computational graph that are connected to a node of the computational graph and whose signatures are converted by the hash function into a minimum of all the numerical values and removing all other edges that are connected to the corresponding node of the computational graph; and train the graph neural network based on the generated graph structure and the training data.

7. The control unit according to claim 6, wherein:

for all edges of the computational graph, respectively generate the at least one edge attribute based on at least one node attribute of at least one node that is connected to the corresponding edge.

8. A first control unit configured to train a graph neural network, the first control unit including a first hardware processor configured to:

receive a graph structure for training the graph neural network generated by a second hardware processor, the second hardware processor being configured to:

obtain data representing a computational graph, the computational graph including a plurality of nodes connected by edges, and generate the graph structure for training the graph neural network by removing edges from the computational graph, remove the edges from the computational graph in such a way, that an environment in the computational graph corresponds to an environment in the graph structure, wherein at least one edge attribute is assigned to each edge of the computational graph, and the step of generating the graph structure for training the graph neural network by removing edges from the computational graph includes removing edges from the computational graph based on the edge attributes assigned to the edges of the computational graph, and wherein the at least one edge attribute defines relations between nodes of the computational graph connected by the corresponding edge;

receive training data for training the graph neural network, assign, for all edges of the computational graph, a signature to each respective edge of the computational graph based on the at least one edge attribute assigned to the respective edge, so that similar edges are assigned with the same signature, apply a hash function to respectively convert the signatures assigned to the edges of the computational graph into a numerical value, maintain, for all nodes of the computational graph, those of the edges of the computational graph that are connected to a node of the computational graph and whose signatures are converted by the hash function into a minimum of all the numerical values and removing all other edges that are connected to the corresponding node of the computational graph, and train the graph neural network based on the graph structure and the training data.

9. The first control unit according to claim 8, wherein the training data includes sensor data.

10. An image classifier including a first hardware processor configured to classify image data, the first hardware processor configured to:

receive a graph neural network;

receive a graph structure for training the graph neural network generated by a second hardware processor configured to generate the graph structure, the second hardware processor configured to generate the graph structure being configured to:

obtain data representing a computational graph, the computational graph including a plurality of nodes connected by edges, and generate the graph structure for training the graph neural network by removing edges from the computational graph, remove the edges from the computational graph in such a way, that an environment in the computational graph corresponds to an environment in the graph structure, wherein at least one edge attribute is assigned to each edge of the computational graph, and the step of generating the graph structure for training the graph neural network by removing edges from the computational graph includes removing edges from the computational graph based on the edge attributes assigned to the edges of the computational graph, and wherein the at least one edge attribute defines relations between nodes of the computational graph connected by the corresponding edge, receive training data for training the graph neural network;

assign, for all edges of the computational graph, a signature to each respective edge of the computational graph based on the at least one edge attribute assigned to the respective edge, so that similar edges are assigned with the same signature;

apply a hash function to respectively convert the signatures assigned to the edges of the computational graph into a numerical value; and maintain, for all nodes of the computational graph, those of the edges of the computational graph that are connected to a node of the computational graph and whose signatures are converted by the hash function into a minimum of all the numerical values and removing all other edges that are connected to the corresponding node of the computational graph train the graph neural network based on the graph structure and the training data; and classify image data using the graph neural network.

* * * * *